United States Patent [19]
Abel

[11] Patent Number: 5,296,136
[45] Date of Patent: Mar. 22, 1994

[54] APPARATUS FOR SEPARATING LIQUIDS AND SOLIDS COMPRISING SCREENS AND AUGERS

[76] Inventor: Gunther Abel, 8212 Alpine Way, Whistler, British Columbia, Canada, V0N 1B0

[21] Appl. No.: 15,143

[22] Filed: Feb. 9, 1993

Related U.S. Application Data

[62] Division of Ser. No. 729,535, Jul. 15, 1991, Pat. No. 5,207,904.

[51] Int. Cl.5 .................. B01D 33/06; B01D 33/76
[52] U.S. Cl. ............................ 210/158; 210/159; 210/161; 210/173; 210/202; 210/203; 210/210; 210/217; 210/252; 210/259; 210/298; 210/394; 210/396; 210/499; 210/525
[58] Field of Search .............. 210/155, 157, 158, 159, 210/161, 201, 203, 210, 213, 217, 221.1, 174, 252, 256, 259, 297, 308, 324, 394, 396, 403, 415, 499, 525, 528, 298

[56] References Cited

U.S. PATENT DOCUMENTS

| | | | |
|---|---|---|---|
| 4,634,524 | 1/1987 | Huber | 210/158 |
| 4,836,919 | 6/1989 | Huber | 210/158 |
| 5,006,236 | 4/1991 | Crocket | 210/162 |
| 5,110,461 | 5/1992 | Abel | 210/158 |

Primary Examiner—Robert A. Dawson
Assistant Examiner—Sun Uk Kim

[57] ABSTRACT

Apparatus for separating solids and liquids has an initial separator for removing coarse solid material from a mixture of solids and liquids, a first screen for separating further solid material from the liquid and a first auger extending axially through the first cylindrical screen for removing the separated further solid material from the first cylindrical screen. A second screen receives the liquid from the first screen and separates fine particles from the liquid, and a compactor between the first and second screens compacts the solid material removed from the first screen by the first auger. A second auger is provided in the second screen for mixing and removing the compacted solid material and the separated fine particles.

10 Claims, 10 Drawing Sheets

APPARATUS FOR SEPARATING LIQUIDS AND SOLIDS COMPRISING SCREENS AND AUGERS

CROSS-REFERENCE TO RELATED APPLICATION

This is a division of application Ser. No. 07/729,535, filed Jul. 15, 1991, now U.S. Pat. No. 5,207,904.

BACKGROUND OF THE INVENTION

1. Field of the Invention

The present invention relates apparatus for separating liquids and solids, e.g. from a mixture of biological waste material or sludge and water.

More particularly, the present invention is useful, for example, in the treatment of biological waste and sludge by dewatering and composing to form fertilizer, and in the conversion of waste water into usable water or even into drinking water, and may be employed in the treatment of waste in waste treatment plants, from municipal sewerage systems, industrial sewage treatment plants, and other sources of human and animal waste, for example slaughter houses, hospitals and other buildings, greenhouses and other agricultural installations. The present apparatus may be connected to or separate from sewers and is useful both in fixed installations and in mobile waste treatment apparatus.

2. Description of the Prior Art

For the separation of solids from liquids, it is known to employ a cylindrical screen or basket formed of a plurality of circular bars which are spaced apart axially of the screen and which extend around an auger which is coaxial with the screen and which extends upwardly, at an inclination from the screen, for conveying separated solids from the screen. The auger is provided in an upwardly-open semi-cylindrical trough. The incoming mixture of liquid and solid material flows into the cylindrical screen through a lower, open end of the screen, and the liquid then flows outwardly from the screen between the circular bars, so that the solid material in retained on the interior of the screen. The screen is rotated periodically to raise the solid material over the auger, into which the solid material drops, or a rake is rotated around the interior of the screen to collect and raise the solid material so that it can then be deposited in the auger. One such apparatus is disclosed in U.S. Pat. No. 5,110,461, issued May 5, 1992 to the present inventor.

BRIEF SUMMARY OF THE INVENTION

It is an object of the present invention to provide a novel and improved apparatus for separating liquids and solids.

According to the present invention, there is provided apparatus for separating solids and liquids which has an initial separator for removing coarse solid material from a mixture of solids and liquids, a first screen for separating further solid material from the liquid and a first auger extending axially through the first cylindrical screen for removing the separated further solid material from the first cylindrical screen. A second screen receives the liquid from the first screen and separates fine particles from the liquid, and a compactor between the first and second screens compacts the solid material removed from the first screen by the first auger. A second auger is provided in the second screen for mixing and removing the compacted solid material and the separated fine particles.

In operation of this apparatus, the initial separator may be utilized to separate sand, gravel rocks and other relatively big and hard solid objects from an incoming mixture of liquids and solids. In a preferred embodiment of the invention, the initial separator includes a settling tank, with the first auger extending from the bottom of the settling tank.

Thus, there is effected a three stage separation of the solids, which facilitates disposal of the separated solids and improves the quality of the screened liquid from the second screen.

BRIEF DESCRIPTION OF THE DRAWINGS

Various features, objects and advantages of the present invention will be more readily apparent from the following description of an embodiment thereof given, by way of example, with reference to the accompanying drawings, in which.

DESCRIPTION OF THE PREFERRED EMBODIMENT

Figure 1:
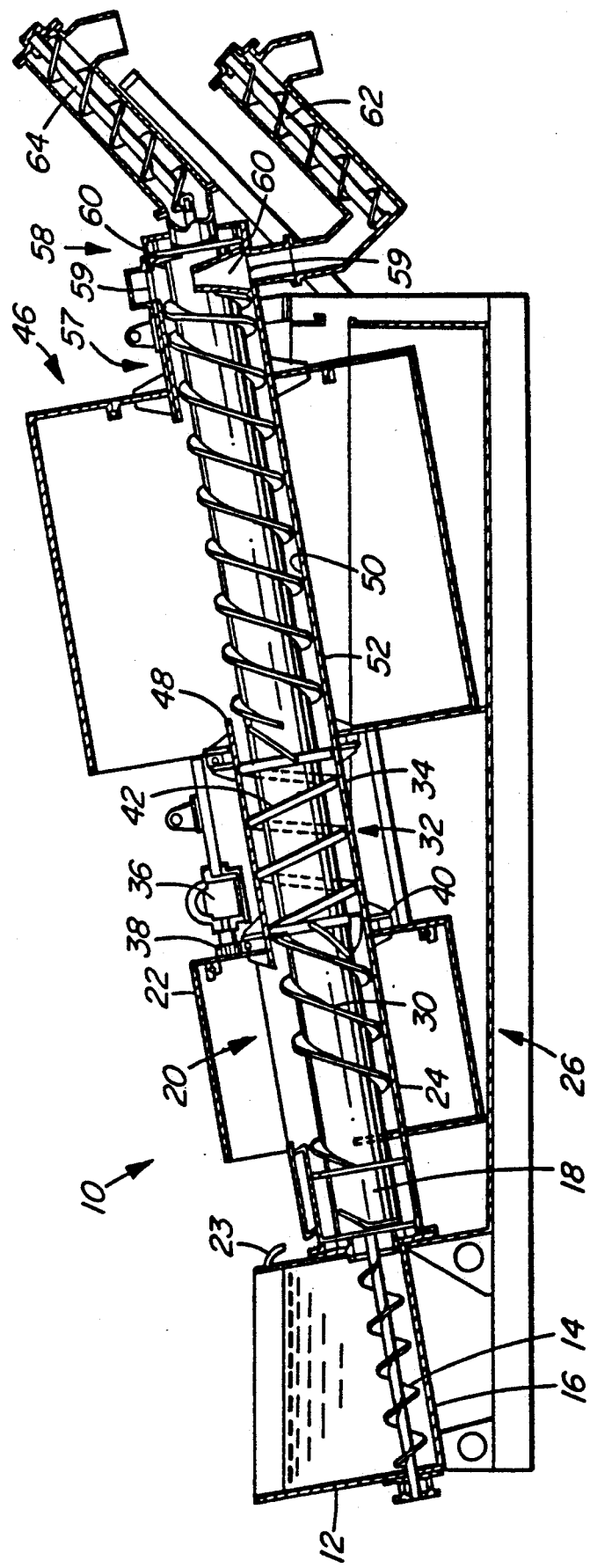
FIG. 1 shows a view in vertical longitudinal cross-section through a dewatering, compacting and extruding machine forming part of the preferred embodiment of the present invention.

As shown in FIG. 1 of the accompanying drawings, a waste material dewatering, compacting and extruding machine indicated generally by reference numeral 10 has an input end provided with an input tank 12 for receiving a mixture of sand and/gravel or other solid material and water. An auger 14 is provided for feeding this solid material along a closed semi-cylindrical bottom wall 16 of the hopper 10 into the hollow interior of a cylindrical tube 18, which forms part of another auger indicated generally by reference numeral 20.

The auger 20 extends through a screen or basket 22, which is formed of co-axial and axially spaced endless bars, as described in greater detail below, and which is intended to receive biological waste material comprising a mixture of solids and liquid from the input tank 12 through an overflow spout 23. The liquid drains through the screen 22, while the solids are retained within the screen 22 by the endless bars and deposited, by rotation of the screen 22, into the auger 20 for conveyance thereby.

The auger 20, within the screen 22, extends along an underlying semi-cylindrical array of bars 24 extending parallel to the axis of the auger 20. Water from the biological waste material fed onto the auger 20 drains through the bars 24 into a tank indicated generally by reference numeral 26. The solids in this biological waste material are retained by the bars 24 and are conveyed along the exterior of the auger tube 18 by helical blades 30 forming parts of the auger 20.

The solid material is fed by the auger 20 into a compactor/chopper section indicated generally be reference numeral 32, which has an external tubular housing 34 mounted for rotation about the tube 18.

An electric motor 36, through a pinion 38, rotates a toothed wheel 40 mounted on one end of the tubular housing 34 for effecting the rotation of the latter and of the screen 22.

Helically-shaped bars 42 are welded to the interior surface of the tubular housing 34 and to the outer peripheral edges of helical cutter blades 44 (FIG. 2), which in turn are welded to the exterior surface of the tube 18. In this way, rotational drive is imparted from the external tubular housing 34 to the tube 18 and, thus, to the entire auger 20, as well as the cutter blades 44.

Figure 2:
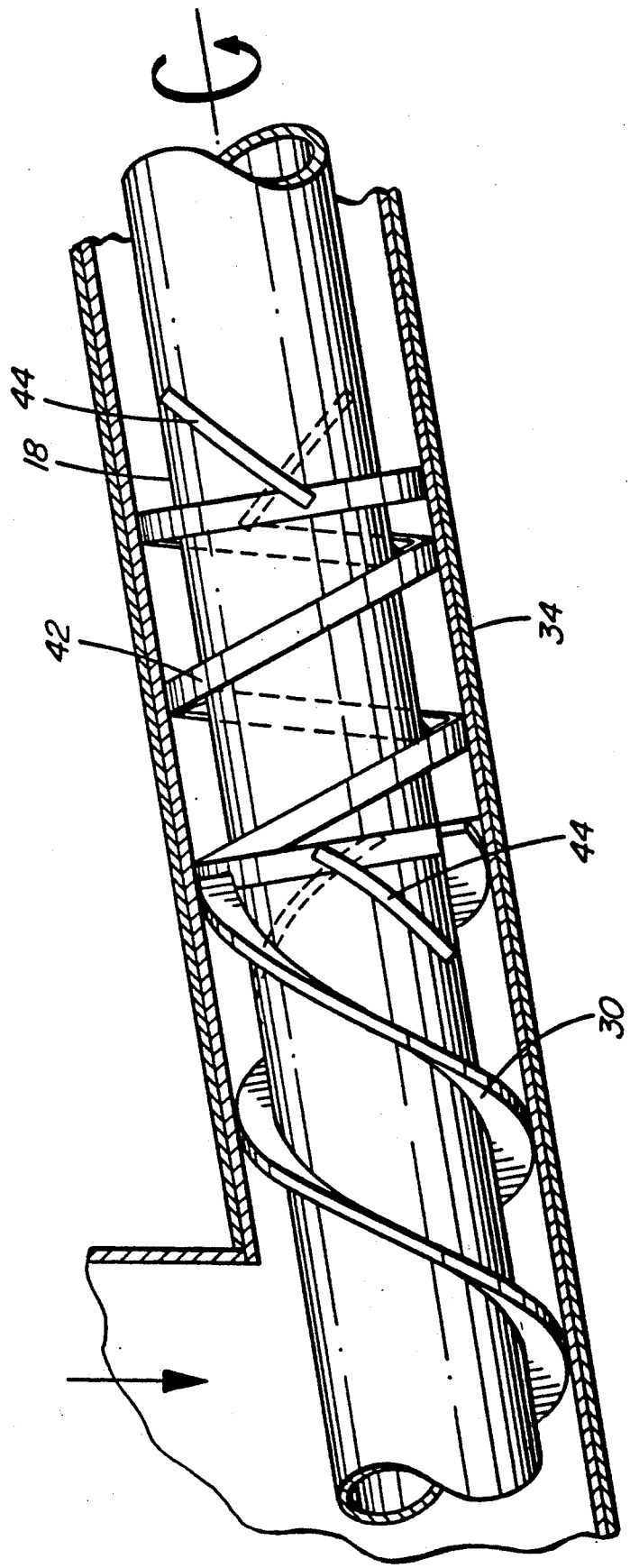
FIG. 2 shows a broken-away view of a modification of a compactor forming part of the machine of FIG. 1.

The compactor/chopper section 32 shown in FIG. 2 differs from that of FIG. 1 in that it is shorter, but it is otherwise similar to that of FIG. 1.

The cutter blades 44 are shaped to effect axial compression and compaction of the solid material fed thereto by the auger 20, while simultaneously chopping the thus-compacted solids.

The compacted and chopped solids are forced from the compactor/chopper section 32 into a portion of the auger 20 extending through a second screen indicated generally by reference numeral 46.

Within the second screen 46, a section of the tube 18 provided at its top with an opening 48 extends along an underlying semi-cylindrical array of longitudinally extending, and laterally spaced, straight bars 50, which are parallel to the axis of the tube 18. A semi-cylindrical micro-screen 52 underlies the bars 50.

Sludge fed into the opening 48 is mixed with the solids being fed along the tube 18, and the resulting mixture is drained through the micro-screen 52.

The screen 46 has peripheral micro-screens 54 (FIG. 5) extending around the exterior of co-axial, axially spaced screen bars 56, and receives liquid from the tank 26. By means of the micro-screen 54, fine solids are separated from this liquid and deposited onto the auger 20, as described in greater detail below. These fine solids may, for example, be solids small enough to have fallen downwardly through the bars 24 in the screen 22.

The compaction of the solids by the compactor/chopper section 32 forms a relatively tight mass of compacted material which prevents liquid from draining downwardly along the tube 18 into the compactor/chopper section 32 from the hopper 48.

From the section of the auger 20 within the second screen 46, the mixture is advanced along the tube 18 into a second compactor section indicated generally by reference numeral 57, in which the turns of the helical auger blades 30 are spaced more closely together so as to compact the material conveyed thereby.

From the compactor 57, the compacted material passes into an extruder indicated generally by reference numeral 58.

The extruder 58 has a pair of compactor rotors 60 secured to opposite sides of the tube 18 and each being shaped to extrude the material radially outwardly through slot-shaped openings 59 in a cylindrical housing 60. The material is thus extruded into a relatively thick strip-shaped extrusion, which repeatedly breaks across the width of the extrusion to form substantially brick-shaped pellets or extrusion portions.

These extrusion portions are removed in an upwardly inclined direction by an auger 62, and the sand, gravel and the like fed through the tube 18 by the auger 14 is likewise removed by an auger 64 extending parallel to the auger 62.

Figure 5:
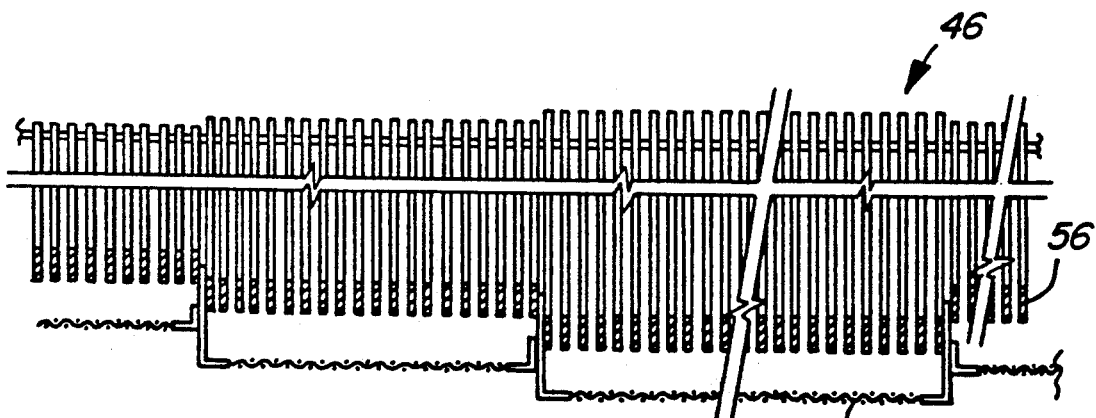
FIG. 5 shows a view in section through parts of the screen of FIG. 4.

As shown in FIG. 5, which is a broken-away view in vertical cross-section through a part of the second screen 46, the screen bars 56 are provided in three different sizes, which are grouped in sets so as to present a series of steps along the axial length of the screen. Such a formation has been found to promote the separation of the solids and the liquids by more securely retaining the solids on the inner peripheries of the bars 56.

Figure 4:
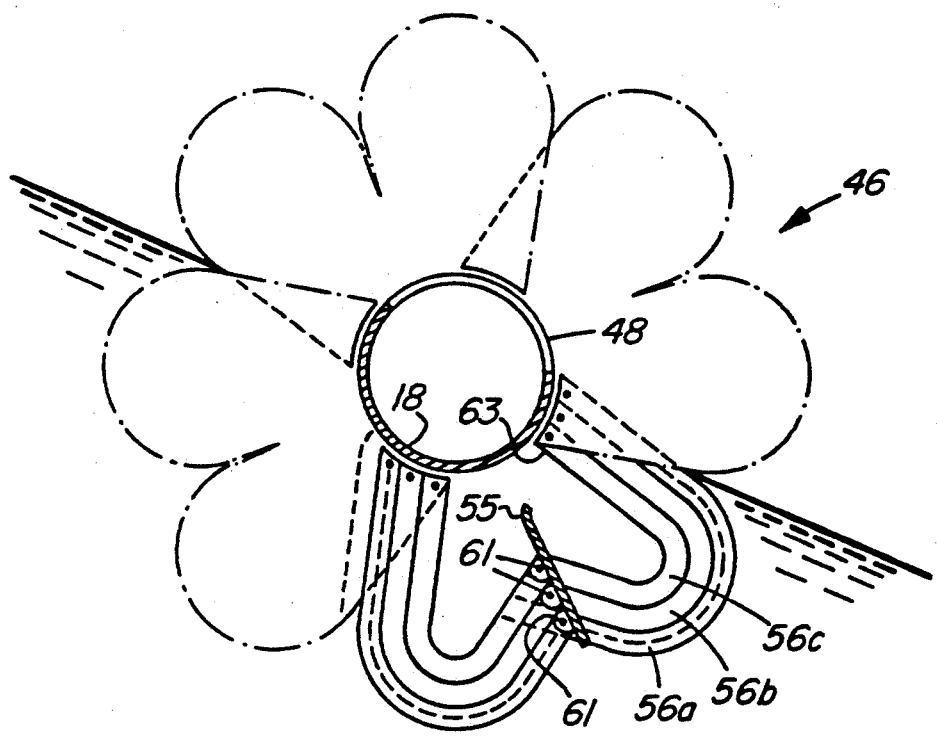
FIG. 4 shows a diagrammatic end view of parts of a screen forming part of the apparatus of FIG. 1.

The shape of the bars 56 is illustrated in FIG. 4, which shows bar components 56a–56c of three different sizes, which are each in the general shape of a J and which are connected together in opposed pairs, by means of longitudinal rods 61, to form radially inwardly open recesses 63.

A radially and longitudinally extending plate 55, which is mounted on the rods 61, protrudes into each recess 63 and serves as a scoop for directing the solid waste material, which collects on the bars 56, into the longitudinally extending opening 48 in the top of the cylindrical tube 18 containing the auger 20.

Figure 6:
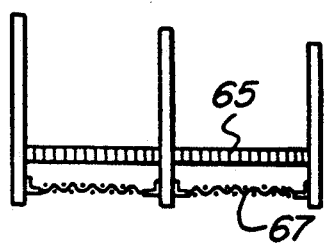
FIG. 6 shows a broken-away view in longitudinal cross-section through parts of another screen of the apparatus of FIG. 1.

The screen 22, of which a broken-away portion is shown in FIG. 6, is constructed of bars 65 which are similar in shape to that of the bars 56 of the screen 46, and which are provided externally of the bars 65 with a microscreen 67 extending peripherally of the screen 22.

Figure 3:
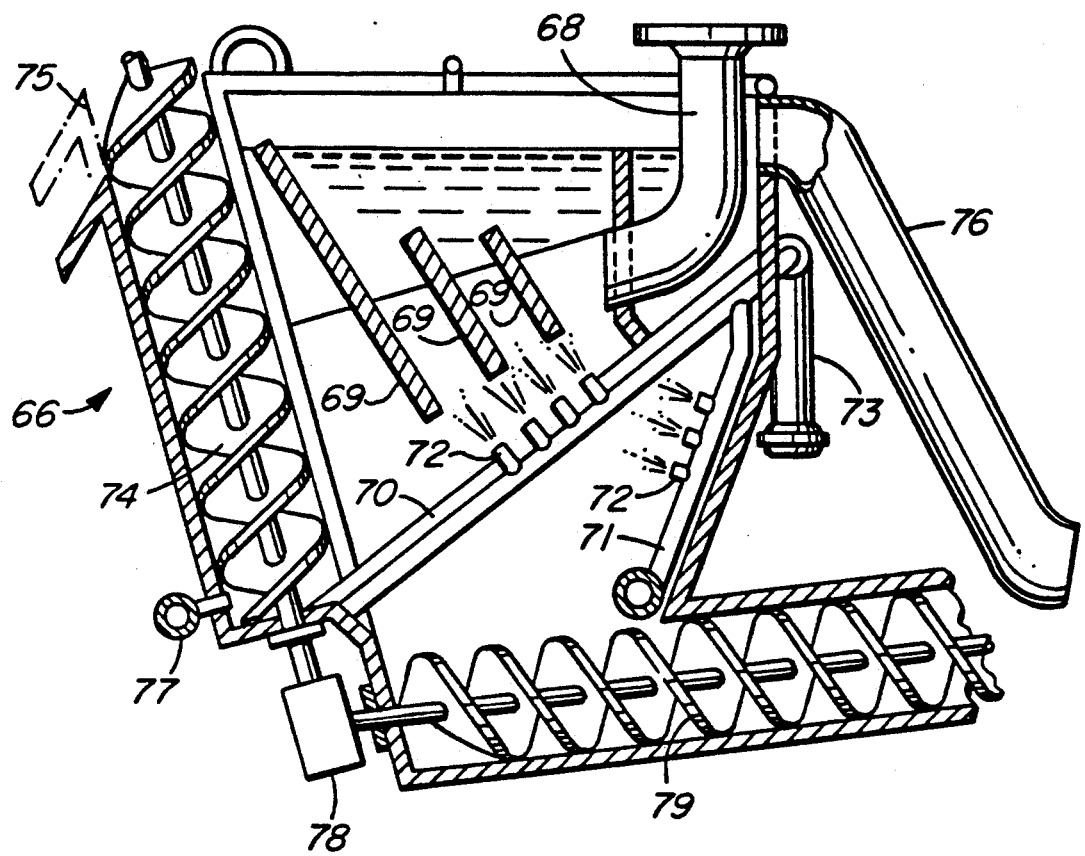
FIG. 3 shows a view taken in vertical cross-section through a modification of an input tank of the machine of FIG. 1.

The modification of the input tank 12, illustrated in FIG. 3 and indicated generally by reference numeral 66, has an input pipe 68 for the inflow of the waste material, and spaced baffles 69 which cause floating material to rise and sand to fall within the tank 66. Beneath the baffles 69, air input pipes 70 and 71 are provided with air discharge nozzles 72 for aerating the contents of the tank and causing the floating material to rise. The air is supplied through an inlet pipe 73, and the pipes 70 form a grid for catching large rocks and other large solid objects and deflecting them to an auger 74. The auger 74 extends up one end of the tank. An output pipe 76 directs the liquid and floating waste material into the tank 26. An air outlet 77 discharges air into the auger 74 for removing floating material and sand from the auger 74. A common drive 78 rotates the auger 74 and also an auger 79, which replaces the auger 14 of FIG. 1 and thus serves to remove sand from the bottom of the tank 66 to the interior of the tube 18.

Figure 7:
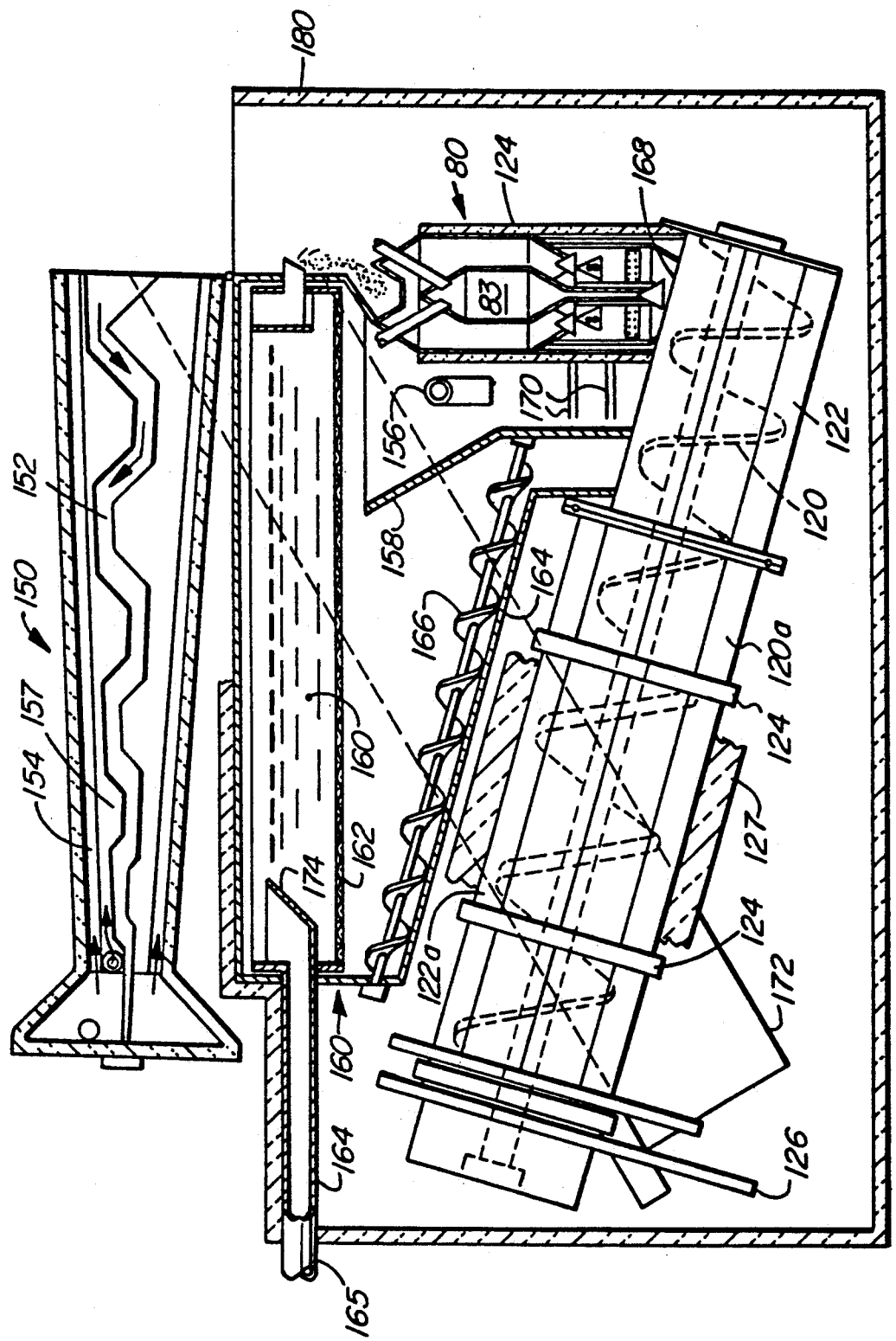
FIG. 7 shows a view in vertical cross-section through a mixing and composting apparatus forming another part of the preferred embodiment of the invention.
Figure 9:
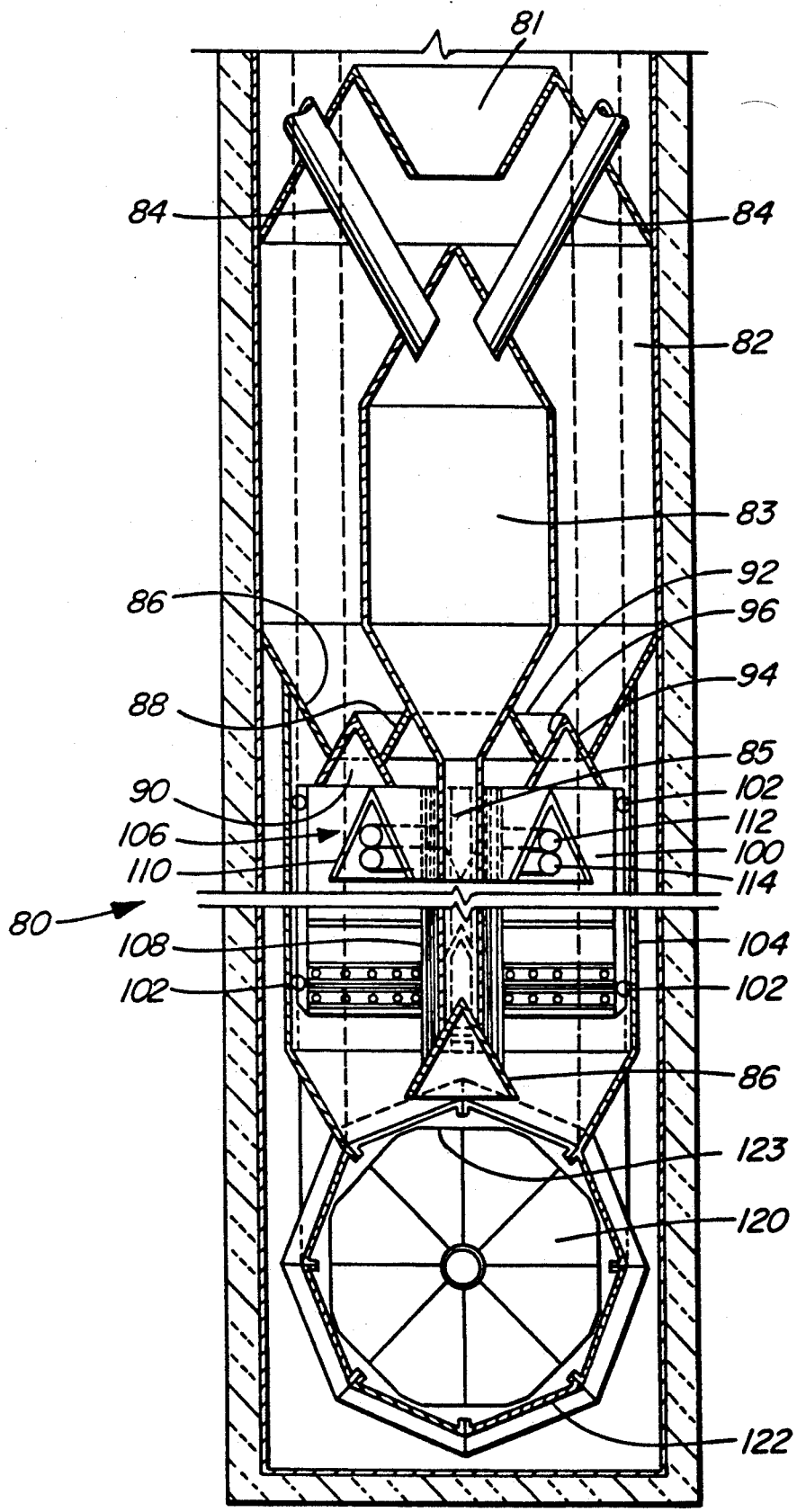
FIG. 9 shows a view taken in vertical cross-section through a precomposter forming part of the apparatus of FIG. 7.

Turning now to FIGS. 7 and 9, the compressed extruded solid material portions conveyed by the auger are deposited into a pre-composting apparatus indicated generally by reference numeral 80 in FIGS. 7 and 9.

The pre-composting apparatus 80 has a vertical top inlet funnel 81 for receiving the compressed, extruded solid material portions from the auger 62 of FIG. 1 and directing them into an outer chamber 82, which extends around a central chamber 83. A pair of inlet pipes 84 extend into the central chamber 83 for supplying additives to the chamber 83. An outlet pipe 85 extends from the bottom of the chamber 83 and bottom of this outlet pipe is provided with a conical closure 86. The closure 86 is reciprocated vertically, as described below, so as to alternately open and close the bottom of the outlet pipe 85 and thus control the outflow through the outlet pipe 85.

The bottom of the outer chamber 82 is formed by opposed frusto-conical walls 86 and 88, which are spaced apart at the bottoms thereof to define therebetween an annular outlet opening 90. An annular closure 92, formed by upwardly convergent annular walls 94 and 96, is vertically reciprocated, as described below, so as to periodically open and close the opening 90 and thereby control the movement under gravity of the waste material downwardly through the opening 90 from the chamber 82 into an underlying cylindrical chamber 100.

The cylindrical chamber 100 is guided by bearings 102 for vertical displacement within a cylindrical housing 104, which is fixed in position.

Within the cylindrical chamber 100 a plurality of arms, one of which is indicated generally by reference numeral 106, project radially outwardly from a central tube 108, which is co-axial with the outlet pipe 85. Each arm 106 has a pair of upwardly convergent walls 110 containing between them a pair of outlet pipes 112 and 114, which serve to discharge air and water into the interior of the chamber 100.

Beneath the cylindrical chamber, there is an auger 120 for receiving the solid material which drops under gravity past the arms 106. The auger 120 is in a hexagonal auger housing 122 and rotates together with a cam 123 which, by sliding contact with the closure 86, vertically reciprocates the cylindrical housing 100, the arms 106 and the tube 108.

The annular closure member 90 is mounted on the top of the cylindrical chamber 100 for reciprocation therewith and thus alternately opens and closes the opening 90, as described above.

In this way, the material in the chamber 100 is aerated and moistened, and may also if required be heated by the use of hot air, to promote the initiation of decomposition of the material fed through the chute 81. Also, if required, the pre-composting apparatus 80 may be heated by heat exchange from a heat-exchange jacket (not shown) to facilitate the composting effect.

Gases given off from the decomposing material pass upwardly into a chimney indicated generally by reference numeral 150 (FIG. 7), where they are condensed in a chimney flue 152 by heat exchange with a cooling fluid travelling downwardly at the exterior of the flue.

The heat exchange fluid, heated in this way, may then be supplied to the above-described heat-exchange jacket of the pre-composting apparatus 80 and/or may be utilized for heating other regions of the apparatus, thus promoting the composting process.

Biological sludge is also fed downwardly through an outer passage 154 in the chimney 150, so as to be heated by the hot gases in the flue 152, and is then discharged through an outlet pipe 156 at the exterior of the pre-composting apparatus 80. A further heat-exchange fluid, e.g. air or water, may be fed down an intermediate passage 157 between the flue 152 and the outer passage 154.

The chimney 150 is pivotable between a collapsed position, in which it is illustrated in FIG. 7, and a raised position (not shown), in which it extends vertically at the right-hand side of the apparatus.

The sludge outlet pipe 156 is located in a funnel-like enclosure 158 within a settling tank indicated generally by reference numeral 160. The tank 160 has, at an upper portion, an upwardly convex, semi-cylindrical filter screen 162. The enclosure 158 acts as a weir to retain at least a portion of the solid content of the sludge within the enclosure 158.

Sediment collecting on a downwardly inclined bottom 164 of the tank 162 is fed downwardly to the right-hand side of the tank, as viewed in FIG. 7, by means of an auger 166.

The partially composted material in the pre-composting apparatus 80 descends into the auger housing 122 through an opening 168 at one end of the housing 122.

Also, the sediment conveyed by the auger 166 and the descending sludge solids passing directly from the outlet pipe 156, proportioned under the control of flap valves 170, are deposited through the opening 168 into the housing 122 so as to be mixed with the partially composted material.

The resulting mixture is conveyed along the upwardly inclined auger housing 122 by means of the auger 120. The housing 122 has an intermediate housing portion 122a which is rotatable in bearings 124 and which is connected to the auger 120 for rotating the auger 122. The auger 122 may be hollow for containing heating fluid to promote the composting of the waste material. The rotation of the housing portion 120a is effected through an electric motor and drive transmission 126. A heat-insulating jacket 127 is provided around the housing 120.

From the upper end of the housing 120, the composting material falls into the lower end of a second upwardly inclined auger housing 172, in which the composting is completed.

Liquid in the tank 160 which rises through the filter screen 162 can flow over a weir 174 into a pipe 164, which may be connected so as to discharge the liquid into the material being composted within the auger housing 122, or into a pipe 165 for discharge from the apparatus.

An air outlet nozzle 173 (FIG. 8) is provided in the tank 160 for aerating the liquid in the tank 160.

Figure 8:
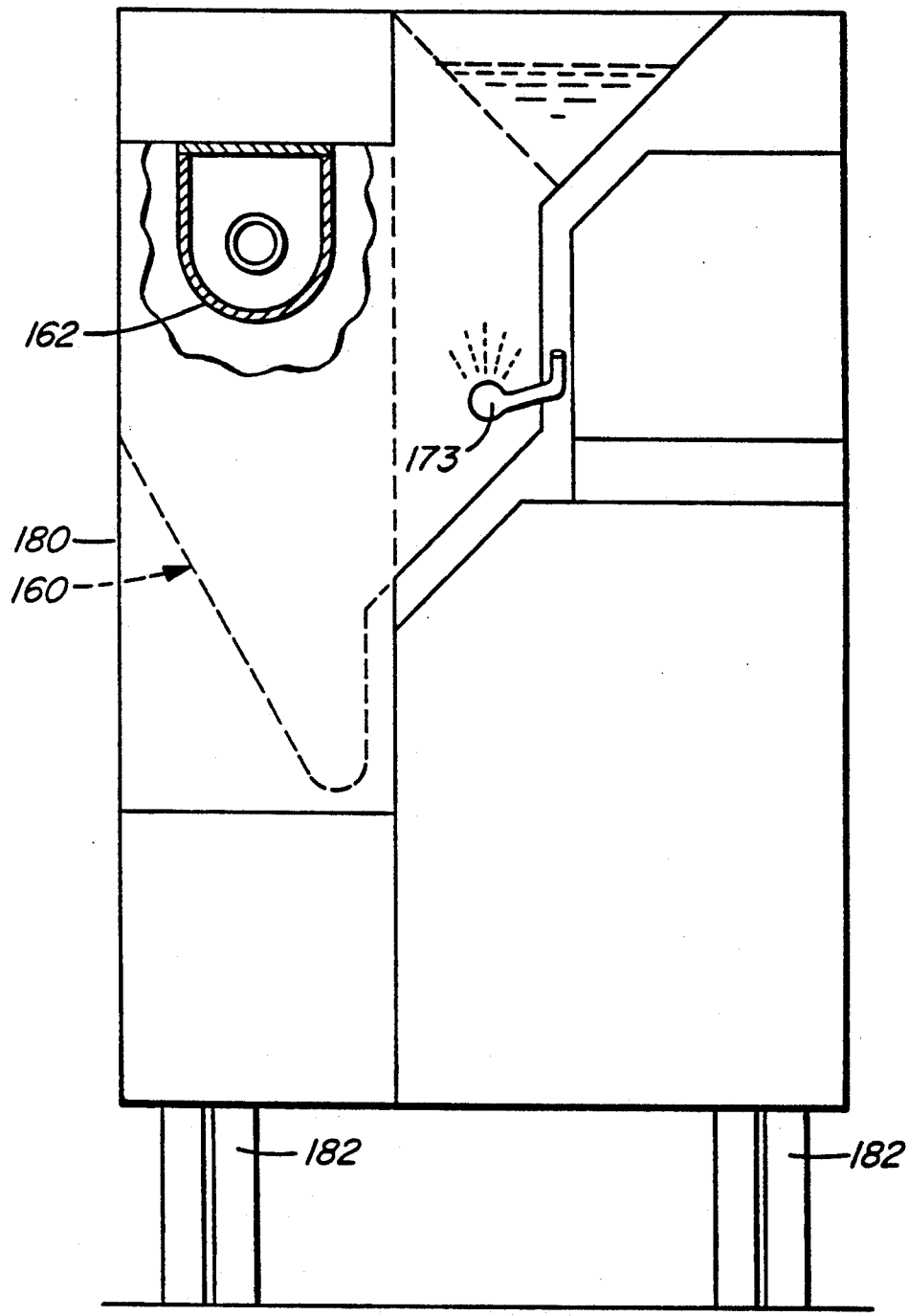
FIG. 8 shows an end view, partly broken away in section, of the apparatus of FIG. 7.

As shown in FIGS. 7 and 8, the above-described apparatus is accommodated within a heat-insulated housing 180, which retains heat within the interior of the housing 180 to promote the composting of the waste material in the augers. The housing 180 is mounted on wheels 182, so that the apparatus is mobile and can thus be moved from site to site, as needed.

Figure 10:
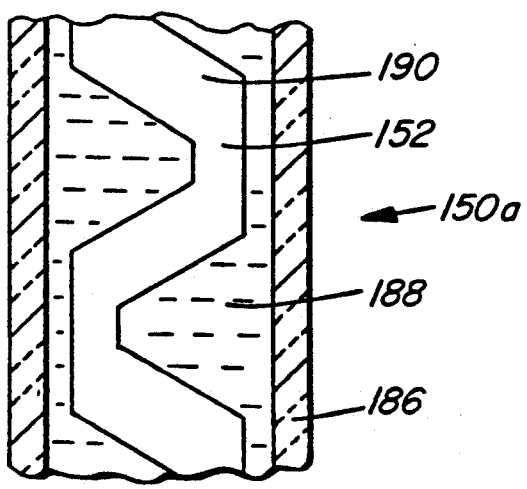
FIGS. 10, 11 and 12 show broken-away views in vertical cross-section through three modifications of a chimney stack forming part of the apparatus of FIG. 7.
Figure 11:
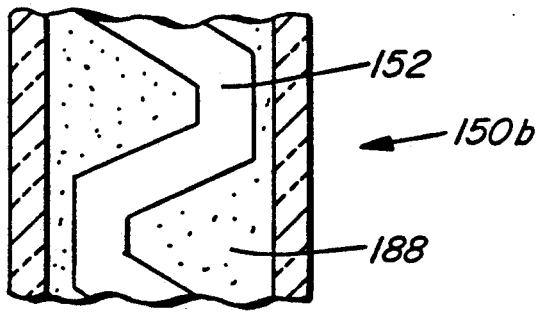
Figure 12:
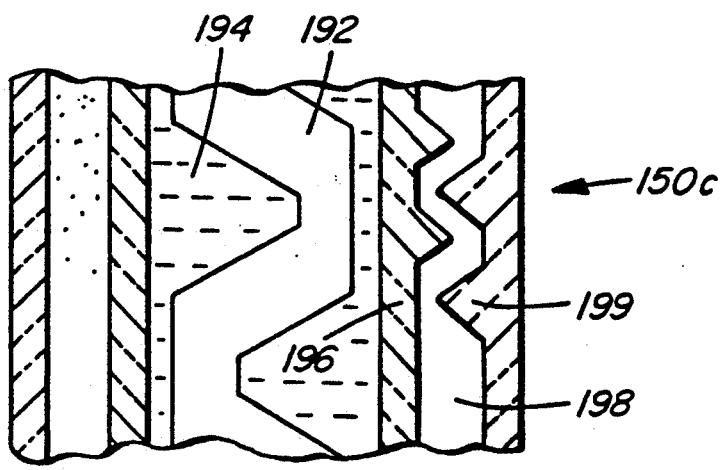

FIGS. 10, 11 and 12 show broken-away views, in vertical cross-section, through chimneys indicated generally by reference numerals 105a, 150b and 150c, respectively, which are modifications of the chimney 150 of FIGS. 7 and 8.

Chimney 150a has an outer jacket 186 of heat-insulating material surrounding an outer passage 188 containing a flowing or stationary cooling fluid around a flue 190.

Chimney 150b is similar to chimney 150a except that in this case the passage 188 contains a heat-exchange medium.

Chimney 150c has, around a flue 192, a passage 194 for containing a cooling or heating fluid, an intermediate jacket 196 of heat-insulating material, a second flue 198 at the exterior of the jacket 196, and an outer jacket 199 of heat-insulating material.

The above-described chimneys may be used in a vertical position or an inclined position.

Figure 13:
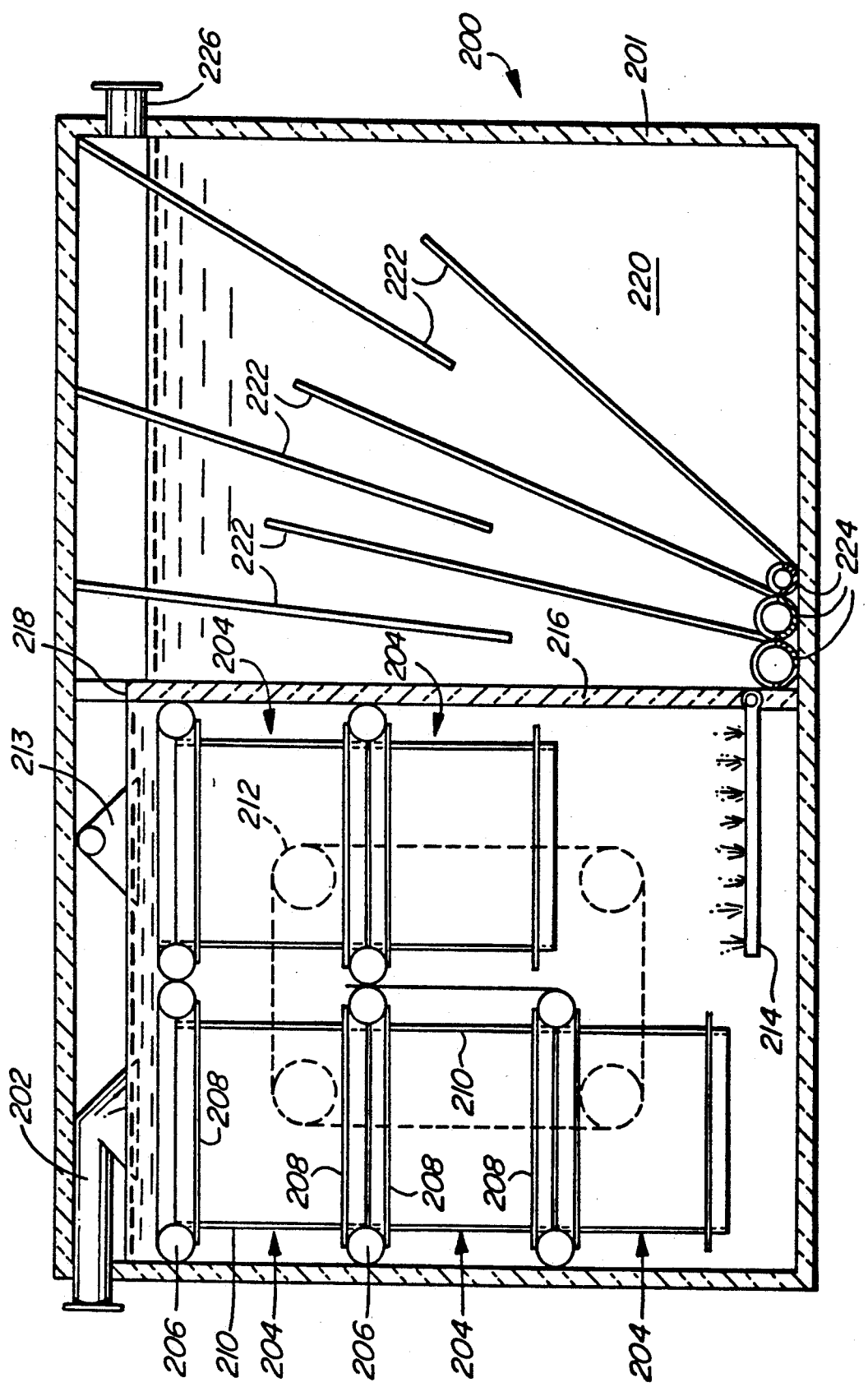
FIG. 13 shows a view in vertical cross-section through a cooling/clarification tank for use with the apparatus of FIGS. 1 through 9.

FIG. 13 shows a view taken in vertical cross-section through a cooling-clarifying tank indicated generally by reference number 200 provided with a heat-insulating jacket 201. The tank 200 has in inlet pipe 202 for introducing into the interior of the tank the water flowing from the apparatus of FIG. 7 through the pipe 165. The pipe 202 discharges downwardly into a filtering arrangement which has five filter components, indicated generally be reference numberal 204.

Each filter component has an upper, peripherally extending resilient sleeve 206, and a pair of vertically spaced upper and lower annular plates 208 extending around a cylindrical wall 210. The arrangement is such that the sleeves 206 are resiliently vertically compressed between the annular plates 208 of each pair of superimposed filter components 204, so as to seal the components to one another.

The cylindrical walls 210 contain a filter material, e.g. sand, for filtering any particulate material in the incoming liquid.

The filter components 204 are movable clockwise around an endless path by means of an endless drive chain mechanism 212 so as to be located in succession below the inlet pipe 202 and then to move to the right to a location below a suction nozzle 213, which serves to suck up the solid material trapped on the filter components. This action is facilitated by the provision of air outlets 214 underneath the filter components 204 which are located below the suction nozzle 213.

The interior of the tank is partitioned by a wall 216 having a top edge 218 spaced downwardly from the top of the tank so as to form a weir, over which the liquid can flow into a settling chamber 220.

A set of spaced, inclined baffles 222 direct the flow of the liquid through the settlement chamber along a serpentine course, and suction pipes 224, having open tops, are provided at the bottom of the settlement chamber for collecting and removing any solid material which sinks to the pipes 224.

The clarified liquid leaves the tank 200 through an outlet pipe 226.

The liquid may be aerated and passed through a clarification and settlement tank to remove aerated sludge before entering the tank 200, and the solid material removed in the tank may be fed back to the screen 46 of FIG. 1.

If required, the liquid in the settlement chamber 220 may be chlorinated so as to make it drinkable.

Figure 14:
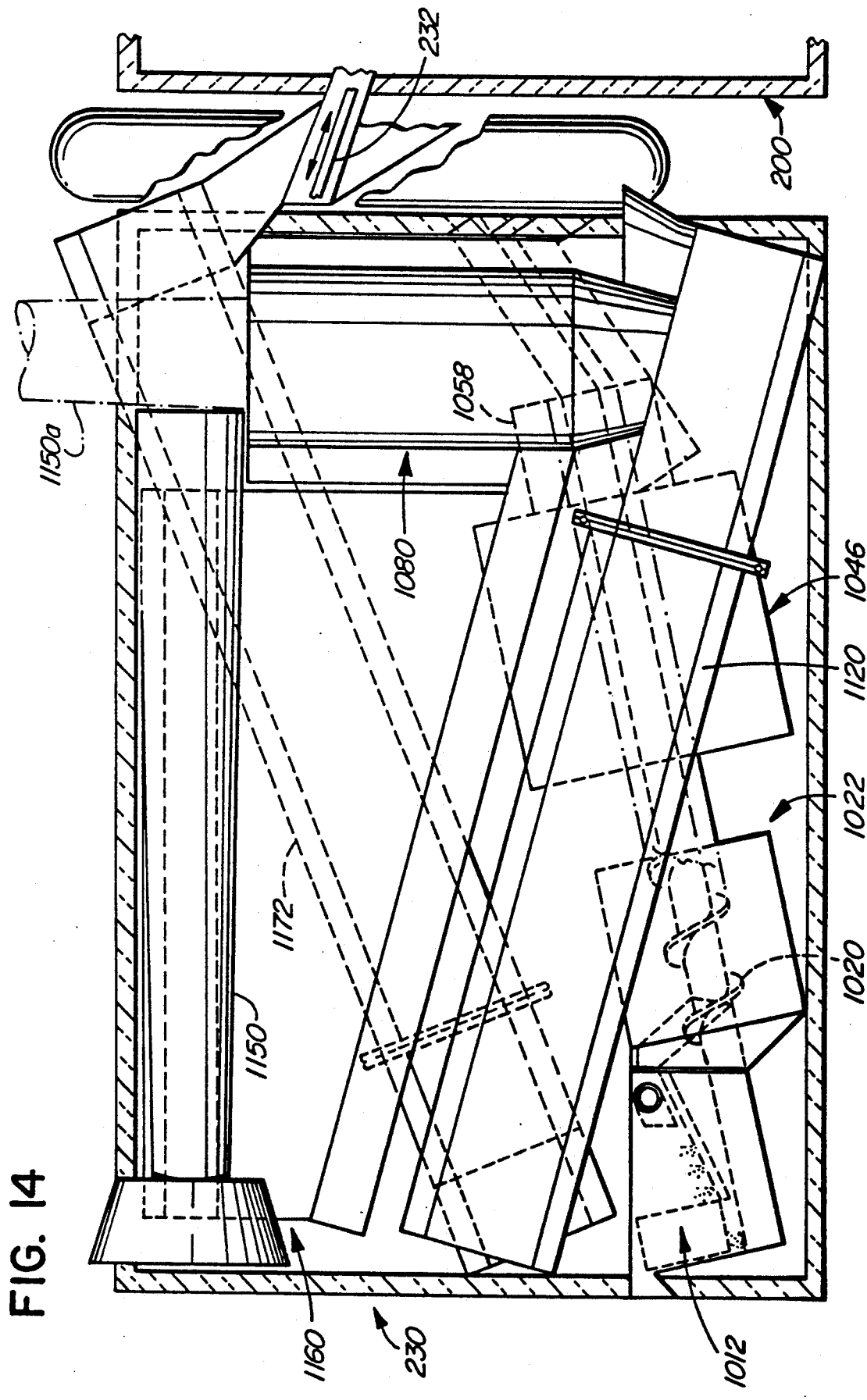
FIG. 14 diagrammatically illustrates a combination, in a single housing, of the apparatuses of FIGS. 1 through 9.

FIG. 14 diagrammatically illustrates how the apparatuses of FIGS. 1 through 9 may be accommodated within a common heat-insulating housing indicated generally by reference numeral 230.

To facilitate understanding of the arrangement of FIG. 14, components of the apparatuses of FIGS. 1 through 9 which are shown in FIG. 14 are indicated by the corresponding reference numerals increased by 1000.

The components of FIG. 1, from the input tank to the extruder are located at the lower portion of the housing 230, as indicated by input tank 1012, auger 1020, screen 1022 and 1046 and extruder 1058.

Pre-composter 1080 is shown at the right-hand end of the housing 230, with auger housing 1120 extending upwardly and to the left.

Second auger housing 1172 is upwardly inclined to the right, and tank 1160 extends between auger housings 1120 and 1172.

Chimney 1150 is shown in full lines in its collapsed condition and in broken lines, at 1150a, in its erected, vertical operational position.

A connection 232 is shown between the tank 230 and the cooling/clarifying tank 200 of FIG. 13.

I claim:

1. Apparatus for separating solids and liquids, comprising:
    an initial separator means for removing coarse solid material from a mixture of solids and liquids;
    a first screen having a hollower interior for separating further solid material from the liquid;
    a first auger extending axially through the first screen for removing the separated further solid material from the first screen;
    a second screen having a hollow interior for receiving the liquid from the first screen and for separating fine particles from the liquid;
    a second auger coaxial with the first auger and extending axially through the second screen for mixing and removing the solid material and the separated fine particles from the second screen; and
    a compactor connecting the first and second augers for compacting the solid material removed from the first screen by the first auger and conveying the solid material to the second auger.

2. Apparatus as claimed in claim 1, wherein the second screen comprises a microscreen extending around and spaced radially outwardly from the second auger.

3. Apparatus as claimed in claim 1, further comprising an extruder for forming the solid material conveyed by the second auger into extrusions.

4. Apparatus as claimed in claim 1, wherein the first screen comprises screen bars extending around and spaced radially outwardly of the first auger and spaced apart from one another axially of the first auger to allow the liquid to flow outwardly between the bars while retaining solid material on the bars within the first screen, and means for rotating the first screen about the first auger to allow the retained solid material to be deposited into the first auger.

5. Apparatus as claimed in claim 4, further comprising axially extending, laterally spaced bars in a semi-cylindrical array around the underside of said first auger for retaining the solid material in the first auger while allowing further liquid to drain from the solid material.

6. Apparatus as claimed in claim 1, comprising a third auger extending co-axially through the first and second augers, and the third auger projecting from the first auger at an inlet end of the apparatus.

7. Apparatus as claimed in claim 6, wherein the initial separator means includes a settling chamber for receiving the mixture and the third auger extends along a bottom portion of the settling chamber for removing solid material therefrom.

8. Apparatus as claimed in claim 7, further comprising means for aerating the mixture in the settling chamber.

9. Apparatus as claimed in claim 6, further comprising a second compactor for compacting the solid material conveyed from the second screen by the second auger.

10. Apparatus as claimed in claim 9, further comprising a pellitizer for forming the solid material compacted by the second compactor into pellets.

* * * * *